United States Patent [19]

Fleming et al.

[11] Patent Number: 4,506,450

[45] Date of Patent: Mar. 26, 1985

[54] ILLUMINATED LEVEL

[76] Inventors: John E. Fleming, 2505 N. 52nd Ave., Yakima, Wash. 98908; Robert D. Dameron, 1317 S. 10th Ave., Yakima, Wash. 98902

[21] Appl. No.: 593,960

[22] Filed: Mar. 27, 1984

[51] Int. Cl.³ .............................................. G01C 9/06
[52] U.S. Cl. ........................................ 33/366; 33/348
[58] Field of Search ...................... 33/366, 348, 348.2; 200/184, 61.45 R

[56] References Cited

U.S. PATENT DOCUMENTS

| | | | |
|---|---|---|---|
| 2,338,811 | 1/1944 | Hasbrook | 33/366 |
| 3,166,855 | 1/1965 | Erritt | 33/348 |
| 3,271,650 | 9/1966 | Riddle | 33/366 |

FOREIGN PATENT DOCUMENTS 124287  8/1945  Sweden ................. 33/366

Primary Examiner—Willis Little
Attorney, Agent, or Firm—B. P. Fishburne, Jr.

[57] ABSTRACT

A precision level embodying solid state electronics is disclosed. A level body portion contains chambers for paired light emitting diodes operable to indicate angular deviations from true horizontal and true vertical over desired ranges. A mercury droplet in each compartment is in contact with an arcuate conducting strip leading to a battery terminal of one polarity. Upon angular displacement of the level, the mercury droplet sequentially contacts light emitting diode leads of like polarity. The light emitting diode leads of opposite polarity are connected through a common conductor element and an on-off switch of the level to a battery terminal of like polarity. The same switch is operably connected with the groups of light emitting diodes used to indicate angular deviations from the true horizontal and true vertical. The light emitting diodes may be embedded in a clear transparent medium or in variously colored translucent elements.

3 Claims, 5 Drawing Figures

ILLUMINATED LEVEL

BACKGROUND OF THE INVENTION

The prior art contains teachings pertaining to electrically operated levels including illuminating elements to indicate angular deviations and mercury switch means to activate the illuminating elements. In the prior art, where mercury is employed in the electrical circuits, a rather large pool of mercury is utilized to make contact with electrical terminals of light bulbs during angular deviations of the instrument. Such an arrangement is shown in U.S. Pat. No. 1,375,278. Such large pools of mercury do not contribute to the making of a precision level and the mercury pool has a tendency, particularly when vibration is present, to make contact with the terminals of more than one indicator light bulb at a time. The prior art construction is also rather expensive and somewhat complicated.

Another prior art arrangement in U.S. Pat. No. 4,079,521 utilizes liquid contact switching means contained within rotatable mounting discs which must be machined or molded with precision, rendering the resulting level quite expensive and difficult to manufacture.

Accordingly, the objective of this invention is to provide a precision illuminated level employing inexpensive state-of-the-art solid state illuminating elements connected in a battery-powered circuit through a small droplet of mercury which can make contact sequentially with leads of the light emitting elements as the position of the level deviates from the true horizontal or true vertical. The leads of the light emitting elements are positioned with precision along an arcuate path along which the mercury droplet travels. A single on-off switch is employed to power the light emitting elements of the level during use in a horizontal or vertical mode. The body portion of the level lends itself to molding with high impact plastics. The instrument is convenient to use, rugged and durable, precise and reliable in operation, and comparatively inexpensive to manufacture, utilizing mass production techniques. It can be manufactured in a variety of sizes.

Other features and advantages of the invention will become apparent during the course of the following detailed description.

DETAILED DESCRIPTION

Figure 1:
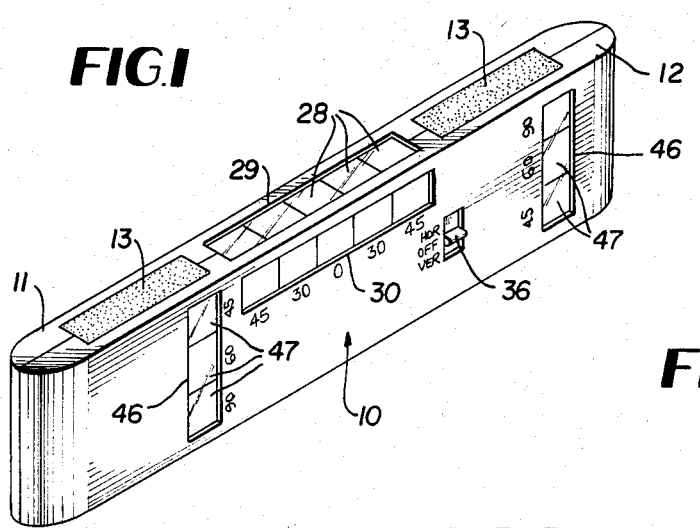
FIG. 1 is a perspective view of a level in accordance with the present invention.
Figure 5:
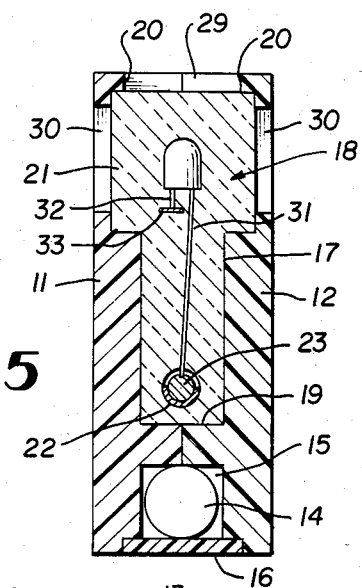
FIG. 5 is a transverse vertical section taken on line 5—5 of FIG. 4.

Referring to the drawings in detail wherein like numerals designate like parts, a precision illuminated level according to the invention comprises a body portion 10 which can be molded from high impact plastics to form two opposing connected half sections 11 and 12. In some cases, other materials can be utilized for the construction of the body portion 10.

Preferably, although not necessarily, permanent magnet plates 13 are inlaid flush with the opposite longitudinal edges of the body portion 10 so that the level can adhere itself by magnetic attraction to certain ferrous metal structures or machinery on which the level is being used. This is a convenience feature which is optional.

Light emitting components of the level, yet to be described, are powered typically by two triple A storage batteries 14 supplying a potential of three volts DC to the system. These batteries are housed in a battery compartment 15 arranged centrally at one longitudinal edge of the level, said compartment being covered by a removable slide 16.

Within the center region of the body portion 10 adjacent to the battery compartment 15 is a chamber 17 which contains a light emitting angle indicating assembly 18 for the horizontal mode of use of the instrument. The chamber 17 has an arcuate interior surface 19 formed on the arc of a circle which spans an angular segment of typically 90°, or 45° on opposite sides of a 0° horizontal level point. In some cases, the angular span or range of the level can be increased or decreased appropriately, as needs dictate.

Held within the chamber 17 fixedly as by locking shoulders 20 is a solid clear plastics block or body 21 shaped to conform precisely to the contours of the chamber 17. Secured within the arcuate edge portion of the body 21 is a conducting (copper) strip 22 having an arcuate uniform cross section throughout its length for containing and confining a single droplet 23 of electrically conducting liquid, such as mercury. The arcuate strip 22 extends for substantially the entire length of the surface 19, and at one end thereof a terminal extension 24 of the strip 22 extends to and is in electrical contact with the negative terminal of the adjacent battery 14.

Enclosed within the clear body 21 are pairs of light emitting diodes (LED) 25, 26 and 27. The diode pairs, through their colored body portions, emit variously colored light when energized. For example, the center pair 25 indicating 0° or true level horizontally may emit red light, the diode pairs 26 indicating 30° angular deviation from the horizontal in either direction may emit blue light, and the diode pair 27 indicating 45° deviation from the horizontal may emit green light. Other colors may be employed. Also, different angular indications over a smaller or greater range may be utilized under the invention.

Figure 2:
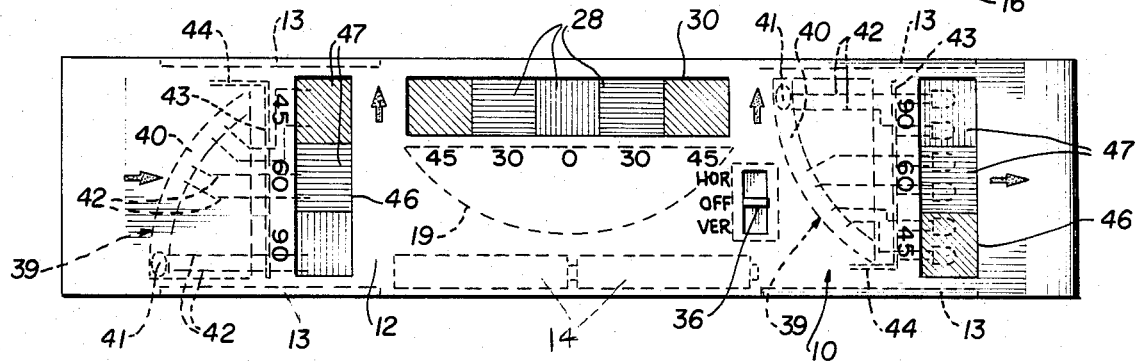
FIG. 2 is a side elevation of the level.

Alternatively, in lieu of colored light emitting elements within a clear block or body 21, white light emitting elements can be employed and the exposed faces of the body 21 through the body portion 10 may consist of variously colored cubes 28, as shown in FIGS. 1 and 2, namely, red, blue and green, for example, indicating, respectively, level, 30° deviation from level, and 45° deviation. In any case, the body portion 10 has edge and opposite side window openings 29 and 30 adjacent to the colored translucent cubes 28 or clear plastic body 21, as the case may be.

Each diode pair 25, 26 and 27 includes negative leads or terminals 31 which project into the arcuate channel defined by the conducting strip 22 radially so as to be able to electrically contact the mercury droplet 23. These terminals 31 are angularly positioned with high precision along the true circular arc of the strip 22 to precisely indicate true level (0°) or 30° or 45° deviation from true level in either direction. To make such indications, both negative terminals 31 of each particular diode pair must contact the droplet 23 so that the diode pair 25, for example, FIG. 4, will emit red light to indicate true level. If only one terminal 31 of a particular diode pair makes contact with the droplet 23, only one diode of that pair will emit light to indicate that a particular surface is close to level but not precisely level. This close indication mode of operation is common to the other diode pairs 26 and 27 when the level is in use.

The LED pairs 25, 26 and 27 also include positive leads or terminals 32, all electrically connected to a common conductor strip 33 within the body 21 of assembly 18. An extension 34 of the positive terminal strip 33 leads to and is electrically connected with one terminal 35 of a three position manual switch 36 on one side of the level having a central "off" position, a horizontal mode position and a vertical mode position. The switch terminal 35 is the horizontal mode terminal of the switch which is shown in the center "off" position at the "off" switch terminal 37 in FIG. 4. A conductor 38 extends from the three position switch 36 to the positive terminal of the other battery 14.

When the switch is moved to the horizontal mode position through the terminal 35, current will flow from the negative battery terminals through strip extension 24 and strip 22, through the droplet 23 and negative leads 31 of LEDs 25, through the corresponding positive leads 32 of LEDs 25 and through the positive strip 33 and extension 34 to switch terminal 35 and through this terminal and through the conductor 38 to the battery positive terminal to complete the circuit. At this time, the LEDs 25 will emit red light to show a true level surface. The other LED pairs are operated in the same manner to show precision deviations from true level, such as 30° or 45°, or a close proximity to such angular deviations, as previously explained.

While the level is thus being used in the horizontal mode, the vertical mode LEDs, yet to be described, are not energized and hence the power in the batteries 14 is conserved according to another feature of the invention.

The operation of the level in the vertical mode of use is essentially identical to its mode horizontally as described above in detail.

For the sake of compactness, the vertical mode diode pairs are held in two separated internal chambers 39 near the opposite ends of the level. Each of these chambers contains three diode pairs to indicate true vertical (90°) and deviation angles such as 60° and 45° on opposite sides of true vertical. The chambers 39 contain circularly curved transversely arcuate conductor strips 40 similar to the strip 22, each holding a mercury droplet 41 which can be sequentially engaged by the negative leads 42 of the LEDs contained in plastics bodies in the two chambers 39. The positive terminals of the paired LEDs in the chambers 39 are connected to a common conductor strip 43 in each chamber 39 corresponding exactly to the arrangement shown in FIG. 4. The two strips 43 are connected in series through extensions 44 thereof, FIG. 2, in effect forming one common positive terminal strip leading to and being electrically connected to the vertical mode three position switch terminal 45, FIG. 4.

Similarly, the two arcuate conductor strips 40 are electrically connected within the instrument to thereby essentially form a common strip leading to and electrically connected with the battery negative terminal.

Figure 4:
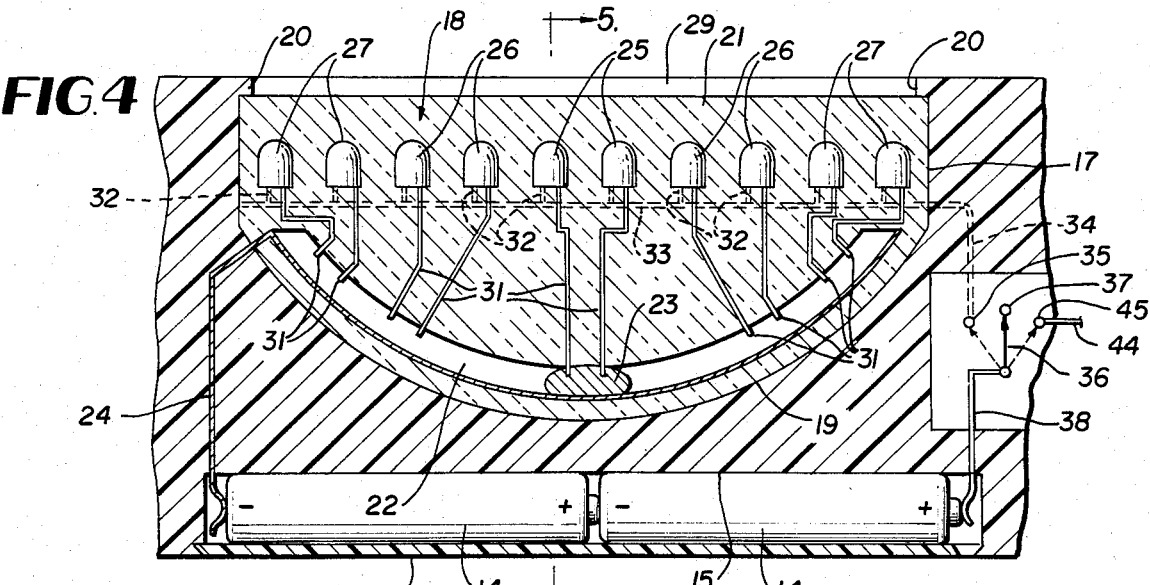
FIG. 4 is an enlarged fragmentary longitudinal vertical section taken substantially on line 4—4 of FIG. 3.
Figure 3:
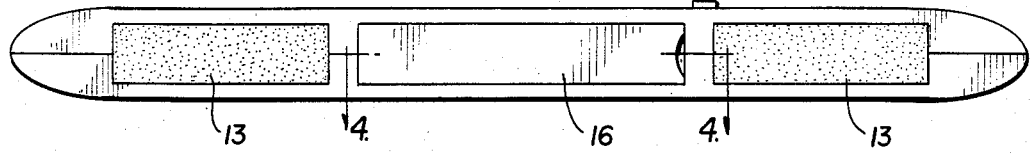
FIG. 3 is a bottom elevation thereof.

During use of the level in the vertical mode, the switch 36 is simply moved to the vertical mode terminal 45 which interrupts the power circuit through the LEDs 25, 26 and 27 shown in FIG. 4 for the horizontal mode, and establishes an identical circuit from the batteries through the droplets 41 and the paired LEDs in the two vertical mode chambers 39. The several angular deviations from the true vertical are indicated in the same manner previously described for the horizontal mode through opposite side viewing windows 46. As stated previously, differently colored light indications can be made through colored translucent cubes 47 or through clear plastics bodies adjacent to the windows 46, as previously described for the horizontal mode.

While the operating switch 36 has been shown and described as being connected with the positive LED terminals through their common positive strips 33 and 43, respectively, it should be understood that the switching, if desired, may be accomplished through the negative terminals of the LEDs.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. An illuminated level for use in horizontal and vertical modes selectively comprising a body portion, the body portion having first and second chamber means and a battery compartment, the body portion also having first and second display windows, a horizontal mode angle deviation indicator assembly mounted within the first chamber means, a vertical mode angle deviation indicator assembly mounted within the second chamber means, each assembly including an arcuate conductor channel containing a single droplet of a conducting liquid movable therein and a plurality of angularly spaced light emitting elements having terminals of like polarity projecting into said channel in the path of movement of said droplet, said light emitting elements having terminals of opposite polarity, a common conductor electrically connected with the last-named terminals, a conductor electrically connected between said channel and storage battery means within the battery compartment, a three position switch on the body portion having an intermediate power off terminal and horizontal and vertical mode operating terminals, a conductor interconnecting the three position switch with said storage battery means, said common conductor of each assembly being electrically connected with said switch horizontal and vertical mode operating terminals, whereby whenever one assembly is electrically energized the other assembly is non-energized to conserve battery power, the first chamber means comprising a single chamber containing the horizontal mode angle deviation indicator assembly, the second chamber means comprising a pair of separated chambers each containing a part of the vertical mode angle deviation indicator assembly, and said parts of the last-named assembly being electrically connected through said common conductor which is electrically connected to said switch vertical mode operating terminal.

2. An illuminated level as defined in claim 1, and said light emitting elements being arranged in pairs of a like color whereby one or both of said leads of a first polarity of each pair of light emitting elements can make electrical contact with said droplet to indicate an approximate angular deviation or a precise angular deviation of the level.

3. An illuminated level for use in horizontal and vertical modes selectively comprising a body portion, the body portion having first and second chamber means and a battery compartment, said first chamber means comprising a single chamber containing a horizontal mode angle deviation indicator assembly, the second chamber means comprising a pair of separated chambers each containing a part of a vertical mode angle deviation indicator assembly, said parts of the vertical mode angle deviation indicator assembly being electrically connected, said horizontal mode angle deviation indicator assembly and said parts of the vertical mode angle deviation assembly each including an arcuate conductor channel containing a droplet of a conducting liquid movable therein and a plurality of angularly spaced light emitting elements having terminals of like polarity projecting into said channel in the path of movement of said droplet, said light emitting elements having terminals of opposite polarity, and circuit means including a manual switch on the body portion and further including conductors connected between said arcuate conductor channels and batteries within said battery compartment.

* * * * *